S. R. BRYGIDER.
MOLD BOX.
APPLICATION FILED JULY 24, 1916.

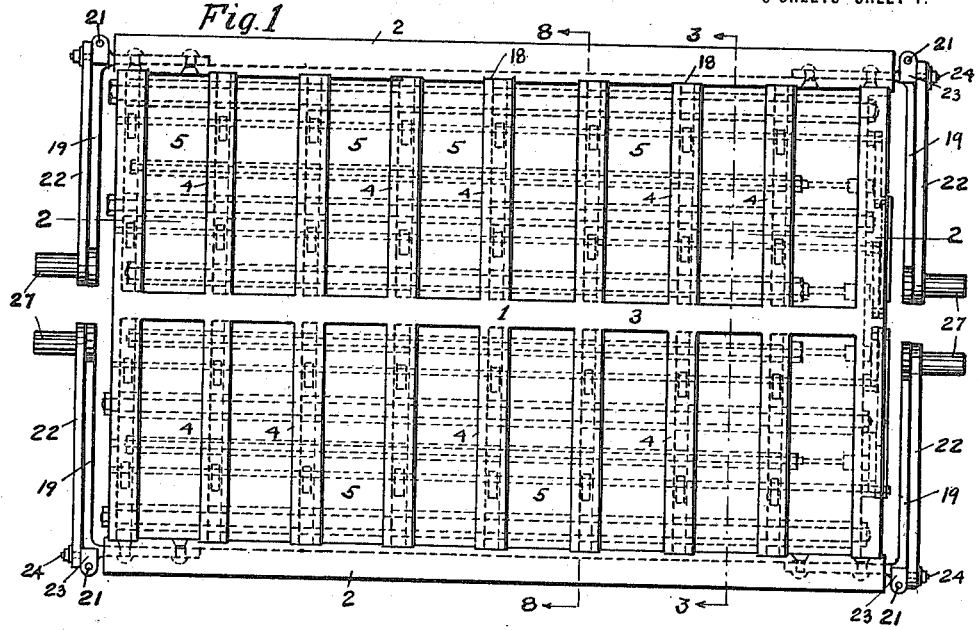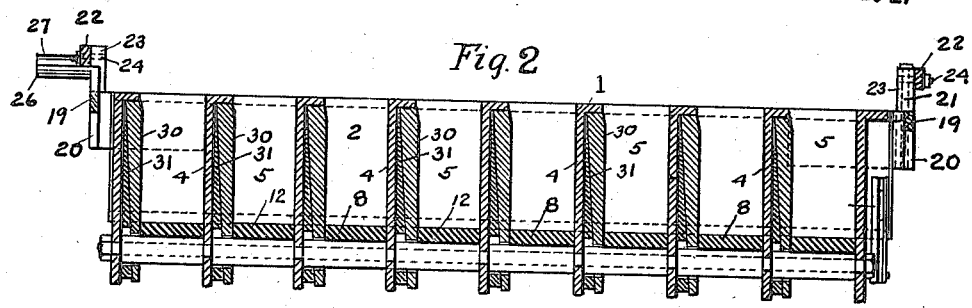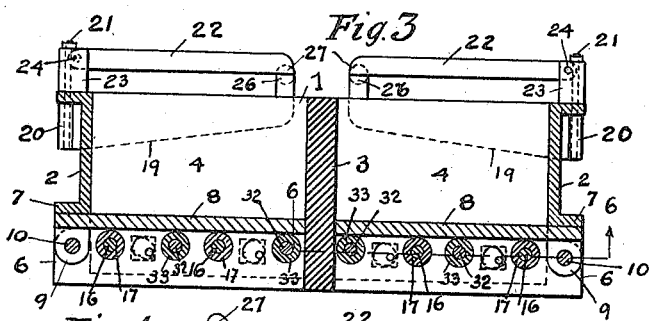

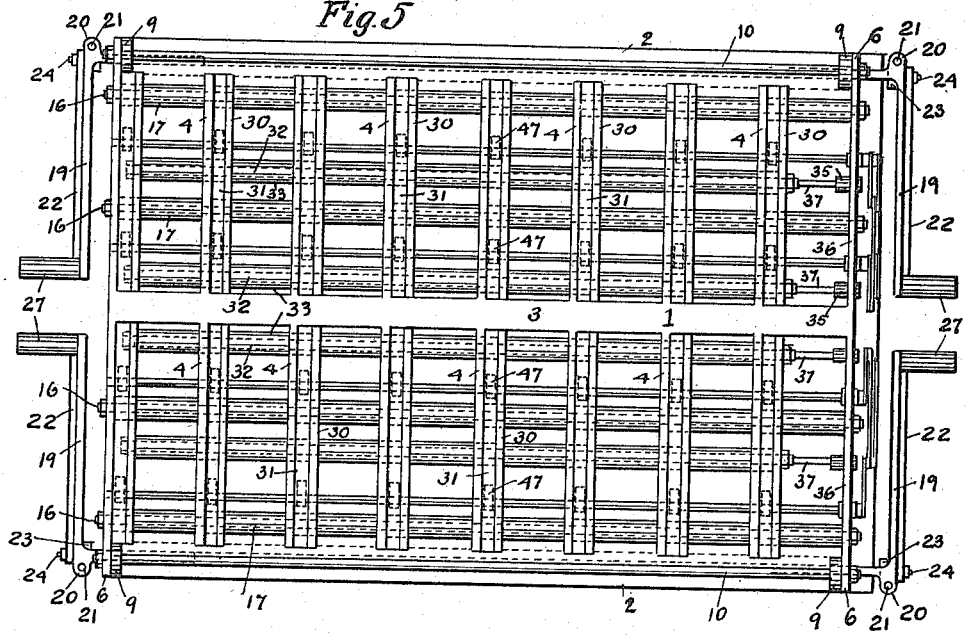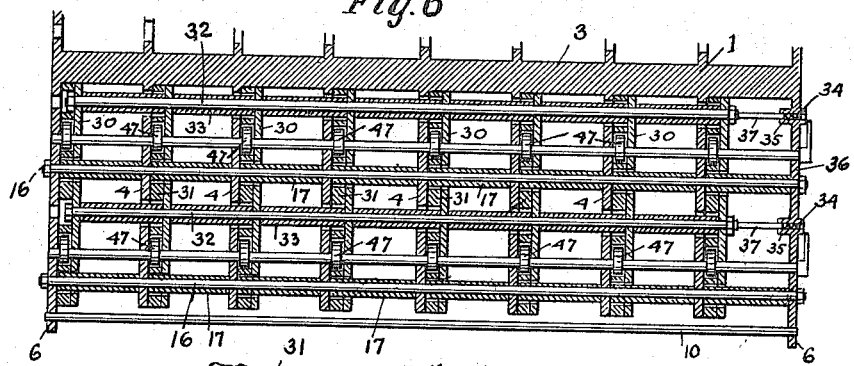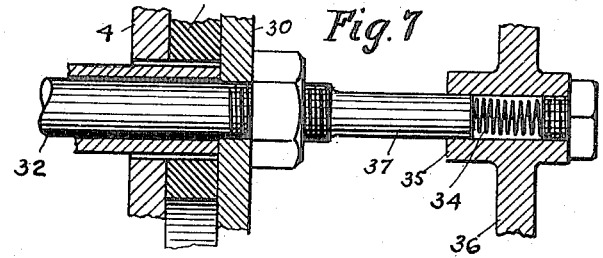

1,221,283.

Patented Apr. 3, 1917.
5 SHEETS—SHEET 3.

WITNESSES:
Fred Levé
Fannie Levé

INVENTOR
Simon R. Brygider

BY
Marcus S Levé
ATTORNEY

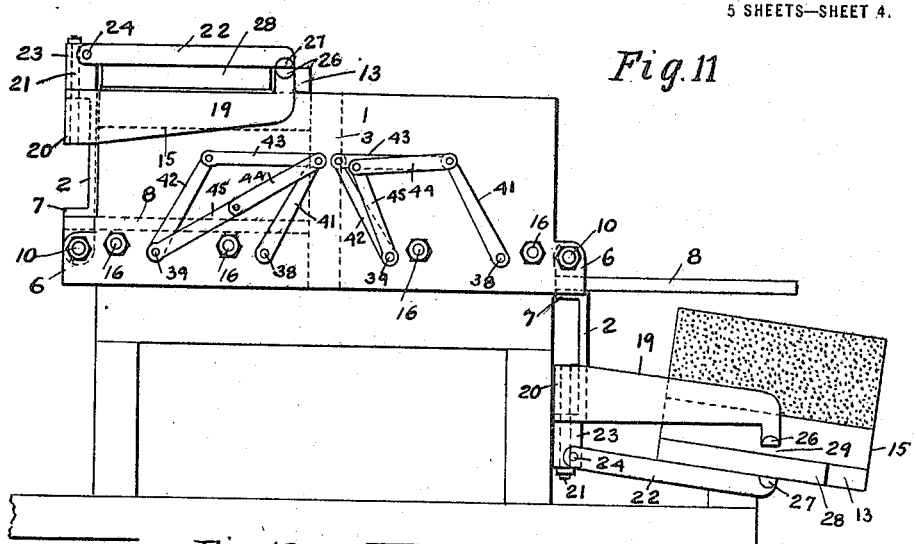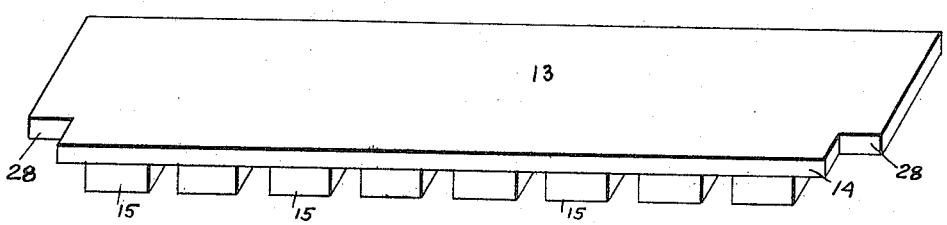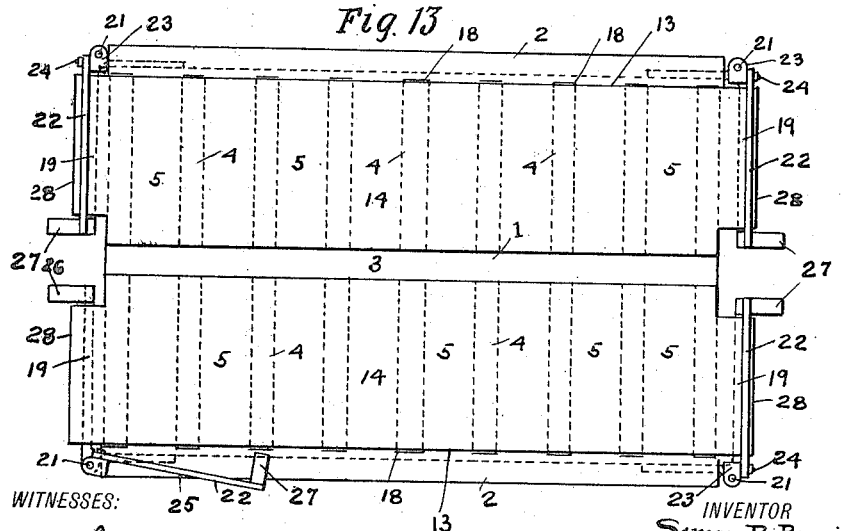

S. R. BRYGIDER.
MOLD BOX.
APPLICATION FILED JULY 24, 1916.

1,221,283.

Patented Apr. 3, 1917.
5 SHEETS—SHEET 5.

WITNESSES:
Fred Levi
Fannie Levi

INVENTOR
Simon R. Brygider
BY
Marcus S. Levi
ATTORNEY

UNITED STATES PATENT OFFICE.

SIMON R. BRYGIDER, OF OAKLAND, CALIFORNIA.

MOLD-BOX.

1,221,283.  Specification of Letters Patent.  Patented Apr. 3, 1917.

Application filed July 24, 1916. Serial No. 110,858.

*To all whom it may concern:*

Be it known that I, SIMON R. BRYGIDER, a citizen of the United States, residing at Oakland, in the county of Alameda and State of California, have invented new and useful Improvements in Mold-Boxes, of which the following is a specification.

My invention relates to improvements in mold boxes especially adapted for molding bricks to be pressed and its object is to devise a box adapted for molding a plurality of bricks at one time and to provide novel means facilitating the removal of said bricks after they are pressed, thus increasing materially the output of the brick plant.

In the accompanying drawings forming part of this specification and illustrating a mold box of my invention.

Figure 1 is a plan of the mold box.

Fig. 2 is a longitudinal section on line 2—2 of Fig. 1.

Fig. 3 is a cross section on line 3—3 of Fig. 1.

Fig. 4 is a detail of one of the side swinging arms and the clamping arm shown in perspective.

Fig. 5 is an under plan of the mold box showing the manner of uniting the yielding plates and the partition ribs:

Fig. 6 is a sectional under plan of a portion of the mold box taken on line 6—6 of Fig. 3.

Fig. 7 is an enlarged detail of the end of one of the tie rods for joining together the yielding plates.

Fig. 11 is an end view of the mold box showing the mechanism operating the releasing wedges.

Fig. 12 is a perspective of one of the pallets used for pressing the brick and removing the same from the mold box.

Fig. 13 is a plan of the mold box showing the manner of engaging the pallets by the swinging and clamping arms before the bricks are removed from the mold box.

The mold box here shown consists of the main body 1 and the two hinged sides 2.

Figure 15:
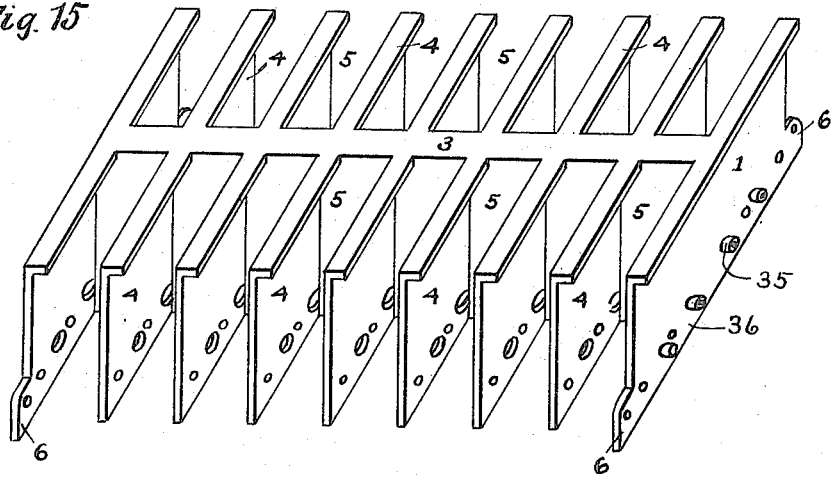

The main body 1 shown in perspective in Fig. 15 consists of the central rib 3 and a plurality of partition ribs 4 projecting on either side of it at regular intervals apart, thus forming two independent rows of compartments 5, each of said compartments making a mold for one brick.

Figure 14:
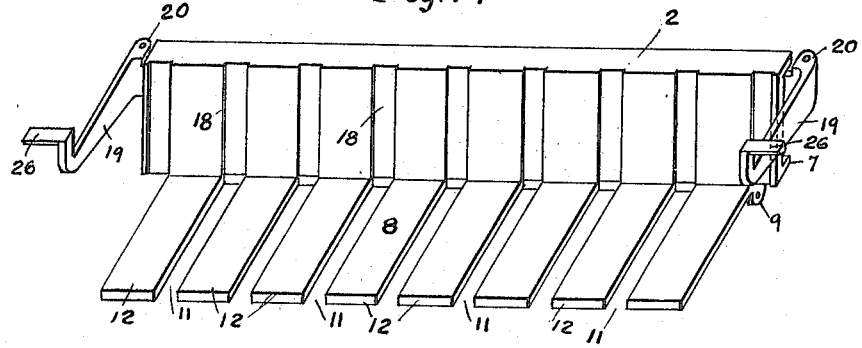
Fig. 14 is a perspective view of one of the swinging sides of the mold box and Fig. 15 is a perspective of the central body of the mold box.

The ribs at the end of the box are provided with the lugs 6 to which the sides 2 of the mold box are hinged. The said sides shown in perspective in Fig. 14 are formed of the channels 7 and the bottom strips 8 which are secured to the bottom flanges of the said channels, forming an integral part thereof, as shown in Figs. 3, 8, 9 and 11.

Ears 9 are provided at the ends of the bottom plates 8 to correspond with the lugs 6 carried by the central body 1 to which the sides become hinged by means of the rods 10.

The bottom plates 8 are formed with the slots 11 cut in them, the spaces between said slots producing the tongues 12 fitting between the partition ribs 4 and forming the swinging bottoms 8 of the several mold compartments shown in Figs. 1 and 2.

The partition ribs 4 are all tied together by the tie rods 16 which are made to pass through spacing tubes 17 fitted between said ribs and are further reinforced by providing grooves 18 in the sides 2 engaging the ends of said ribs when the said sides are closed, thus supporting said ribs when pressure is applied to the bricks.

The arms 19 shown in detail in Fig. 4 are secured at each end of the swinging sides 2, whereby the said swinging sides together with the bottom plates 8 are made to swing when the bricks are being removed. The said arms carry the lugs 20 to receive pivoting pins 21 upon which the pivoting blocks 23 are fitted. The said pivoting blocks carry pivoting pins 24 to receive the fulcrumed ends of the clamping arms 22.

The clamping arms 22 are thus pivoted from the arms 19 by the pivoting pins 21 which permit them to swing in a plane parallel to the bottom plate 8 and by the pivoting pins 24 which permit them to swing in a plane at right angles to said bottom plate 8.

The arms 19 are bent upward at the end, where they are provided with the handles 26, while the clamping arms 22 carry at the free end the handles 27; both said handles 26 and 27 are of a semi-circular cross section and when brought together form a single complete round handle as shown in Figs. 4 and 11 convenient for holding them together, while the two arms make up a frame for engaging the end of the pallet 13 as will be hereafter described.

Figs. 1, 2, and 3 show the mold box with the sides 2 closed when the box is ready for being filled with the brick material. In practice the several compartments 5 are filled with a heap and the surplus material is removed by passing a straight edge over the surface of the mold box. Each compartment thus receives an equal volume of material. The mold box is then brought under a press and all the clamping arms 22 are then swung around the pivoting pins 21 to the position shown at 25 in Fig. 13. The pallets 13 shown in perspective in Fig. 12 are then placed over the two rows of compartments 5 of the mold box.

The said pallets are formed of a board 14 cut to the proper shape and dimensions and provided with projections 28 to become engaged by the clamping arms 22 when the bricks are to be removed; the said boards 14 carry on the bottom wooden blocks 15 having the dimensions of the brick compartments and spaced to correspond to the several compartments of the entire row.

Figure 8:
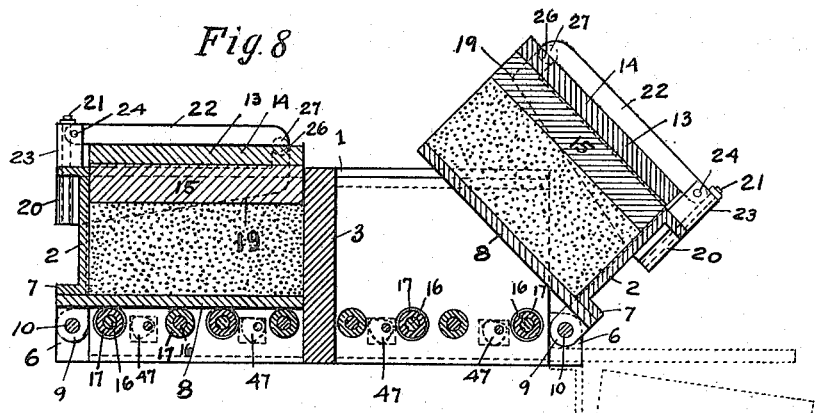
Fig. 8 is a cross section taken on line 3—3 of Fig. 1 showing one of the hinged sides in a position while it is being swung for removing the bricks.

Pressure is then applied on the top of the pallets bringing them down and forcing the wooden blocks 15 into the mold box compressing the brick material as shown in Fig. 8.

Figure 9:
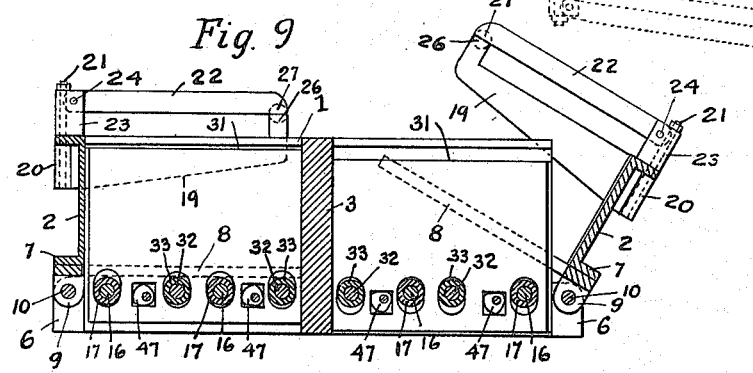
Fig. 9 is a similar cross section taken on line 8—8 of Fig. 1.

The mold box is then removed from under the press and placed upon a stand where the bricks together with the pallets are removed from the mold box. This is done by taking hold of the handle formed by the two halves 26 and 27 and swinging the entire side 2 around the pivoting rod 10 as shown in Figs. 8, 9, and 11.

When the bottom plate 8 has made a half a turn, it comes to a stop, while the clamping arm continues to move, swinging around the pivoting pin 24 until it comes in contact with a stop provided on a stand. The two halves 26 and 27 of the handles are opened apart forming a gap 29, as in Fig. 11, and the pallet together with the bricks is supported by the clamping arms 22. The pallet together with the bricks are then removed by drawing the projections 28 through the gap 29 and carried away to the piling place, the bricks remaining on the pallets.

Before the removal of the bricks from the mold box the pressure on the side of the bricks is first released, for this purpose a number of yielding plates 30 are placed at one side of each compartment and are supported by the wedges 31 fitted between them and the partition ribs 4 as shown in Figs. 2, 5 and 6.

The yielding plates are all tied together by the tie rods 32 passing through the spacing tubes 33 in order to be operated together and they are held yieldingly against the wedges 31 by the coiled springs 34 which are placed in the seats 35 provided on the end ribs 36 of the central body engaging the projections 37 of the rods 32 shown in Fig. 6 and in detail in Fig. 7.

Figure 10:
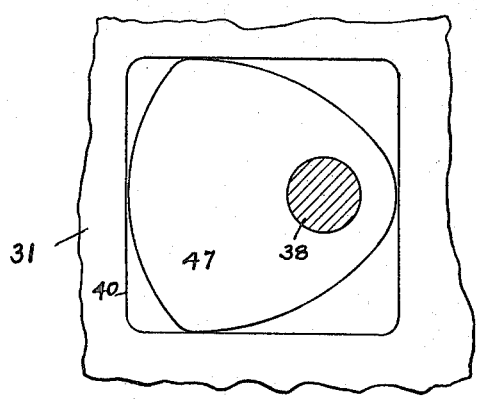
Fig. 10 is an enlarged detail of the cam for actuating the releasing wedges.

The wedges 31 are actuated by the cams 47 (shown in Figs. 6, 9 and 10) carried on the cam rods 38 and 39. The cams 47 are fitted in square holes 40, cut in the wedges 31, they are all actuated by the arms 41 and 42 carried on the cam rods 38 and 39 as shown in Fig. 11. The said arms 41 and 42 are joined together by a link 43 in order to be operated together and are actuated by a toggle composed of the links 44 and 45 secured at one end to the free end of the arm 41 and at the other to the cam rod 39.

By bending the toggle to the position shown at the right of Fig. 11 the wedges 31 are lowered thus releasing the pressure on the bricks and bringing said toggle to the position shown at the left of the same Fig. 11, the wedges are raised causing the sides of the mold boxes to contract again.

The mold box as here shown and described is made up of two independent rows of brick compartments, each operated independently one from the other, while the pressing of the brick is accomplished by a single action of the press.

Having thus described my invention what I claim as new and desire to secure by Letters Patent is:

1. A mold box comprising a central body having a longitudinal rib and rigid cross ribs carried by said longitudinal rib spaced apart forming molding compartments, a swinging side hinged at the open ends of said ribs, grooves provided in the said sides adapted to engage the ends of said ribs, and a swinging bottom comprising a number of tongues secured to said swinging side and fitted between the said cross ribs.

2. A mold box comprising a longitudinal rib, cross ribs carried by said longitudinal rib spaced apart forming molding compartments open at the top, a swinging side hinged at the open ends of said ribs, a swinging bottom comprising a number of tongues secured to said side and fitted between said cross ribs and a pallet comprising a flat board provided at the bottom with a number of blocks adapted to close the top openings of said compartments and to enter the said compartments in order to compress the bricks.

3. A mold box comprising a longitudinal rib, cross ribs carried by said longitudinal rib spaced apart forming molding compartments open at the top, a swinging side hinged at the open ends of said ribs, a swinging bottom comprising a number of tongues secured to said side and fitted between said cross ribs, a pallet comprising a flat board provided at the bottom with a number of blocks adapted to close the top openings of said compartments and on entering compress the bricks and means for releasing said pallet together with said bricks.

4. A mold box comprising a longitudinal rib, cross ribs carried by said longitudinal rib spaced apart forming molding compartments open at the top, a swinging side hinged at the open end of said ribs, a bottom comprising a number of tongues fitted between said cross ribs, a pallet provided with blocks adapted to compress the bricks, swinging arms carried by said swinging sides adapted to engage the said pallet from the bottom and clamping arms adapted to clamp said pallet from the top.

5. A mold box comprising a number of compartments closed on three sides, a swinging side adapted to close the open ends of said compartments, a swinging bottom secured to said swinging side, a pallet provided with a number of blocks adapted to enter the said compartments and to compress the bricks, swinging arms secured to said swinging sides, clamping arms hinged to said swinging arms and handles having a semi-circular cross section secured to said swinging and clamping arms in such a manner as to come opposite one another forming a single handle when brought together.

6. A mold box comprising a longitudinal rib, cross ribs carried by said longitudinal rib placed apart forming molding compartments open at the top, a swinging side hinged at the free ends of said ribs, a swinging bottom secured to said swinging side, a number of yielding plates connected together by tie rods placed within said compartments, springs adapted to force said yielding plates toward said cross ribs, wedges placed between said yielding plates and said cross ribs, and means for moving said wedges in and out.

7. A mold box comprising a longitudinal rib, cross ribs carried by said longitudinal rib placed apart forming molding compartments adapted to receive brick material, a swinging side hinged at the free ends of said cross ribs, a swinging bottom comprising a number of tongues secured to said side and fitted between said cross ribs, means for compressing the brick material and means for releasing the pressure from the sides of said compressed bricks before their removal from the molds.

8. A mold box comprising a longitudinal rib, cross ribs carried by said longitudinal rib placed apart forming molding compartments open at the top, a swinging side hinged at the free ends of said ribs, a swinging bottom comprising a number of tongues secured to said side, yielding plates placed in said compartments, springs adapted to force said plates toward said cross ribs, cams secured on cam shafts and fitted within openings provided in said wedges and means for turning said shafts in order to actuate said wedges.

9. A mold box comprising a number of mold compartments arranged in a row, yielding plates placed within said compartments, tie rods connecting said yielding plates, springs for forcing said plates in one direction and wedges for forcing them in the opposite direction, cam rods, cams carried by said rods engaging the said wedges, and means for actuating said cam rods comprising operating arms and toggles actuating said arms.

SIMON R. BRYGIDER.

Witnesses:
 FRED LEVÉ,
 FANNIE LEVÈ.

Copies of this patent may be obtained for five cents each, by addressing the "Commissioner of Patents, Washington, D. C."